Nov. 10, 1925.

S. W. NICHOLSON 1,561,274

WINDOW CONTROL MECHANISM

Filed May 22, 1922    2 Sheets-Sheet 1

Inventor
Stanley W. Nicholson

By Whittemore Hulbert Whittemore Belknap
Attorneys

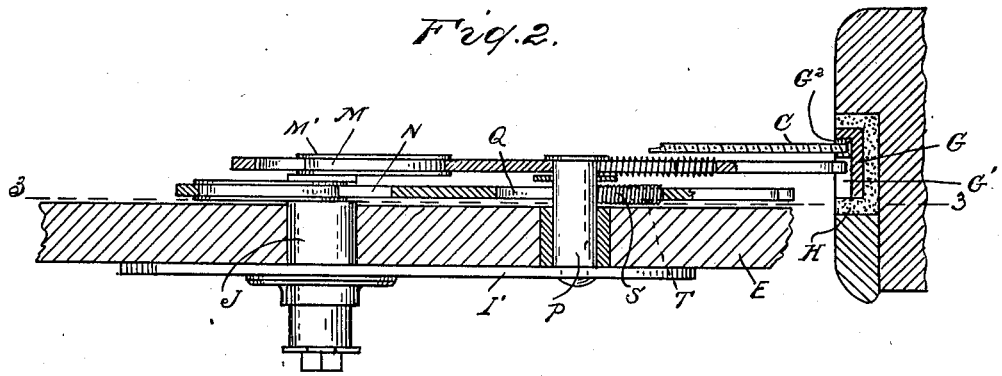
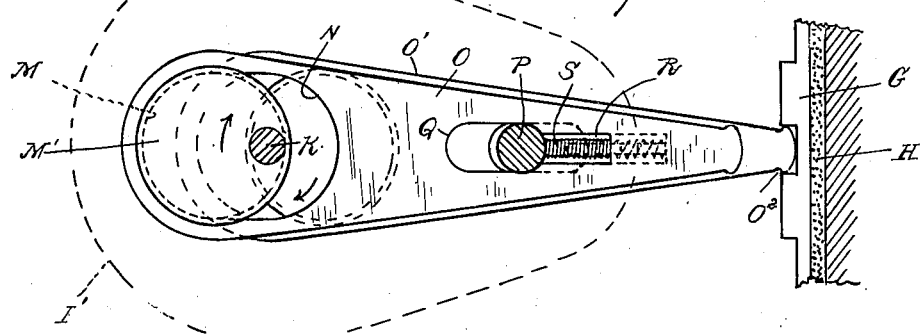
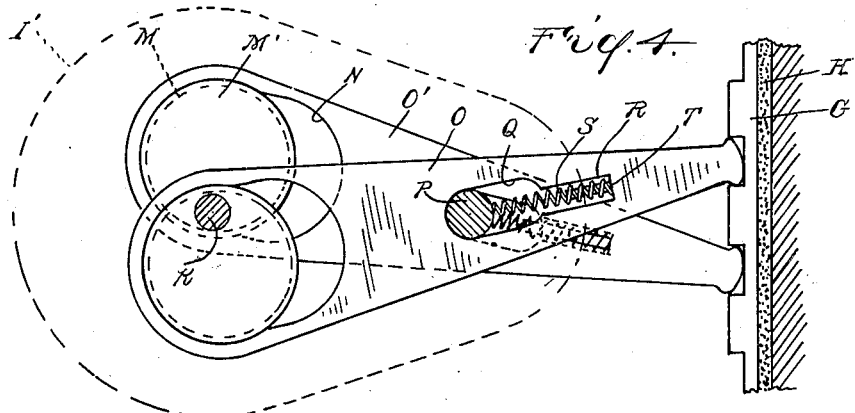

Patented Nov. 10, 1925.

1,561,274

UNITED STATES PATENT OFFICE.

STANLEY W. NICHOLSON, OF TOLEDO, OHIO, ASSIGNOR TO THE DURA COMPANY, OF TOLEDO, OHIO, A CORPORATION OF DELAWARE.

WINDOW-CONTROL MECHANISM.

Application filed May 22, 1922. Serial No. 562,872.

*To all whom it may concern:*

Be it known that I, STANLEY W. NICHOLSON, a citizen of the United States of America, residing at Toledo, in the county of Lucas and State of Ohio, have invented certain new and useful Improvements in Window-Control Mechanisms, of which the following is a specification, reference being had therein to the accompanying drawings.

This invention relates to window control mechanisms and particularly relates to control devices for the sliding windows of vehicles.

The invention consists in the structural features and arrangement of parts hereinafter described.

In the drawings:—

Figure 2 is an enlarged sectional view of the control mechanism taken on line 2—2 of Figure 1;

Figure 3 is a cross section on line 3—3 of Figure 2;

Figure 4 is a view similar to Figure 3 but showing the control arms in their normal position, locking the glass against movement.

Figure 1:
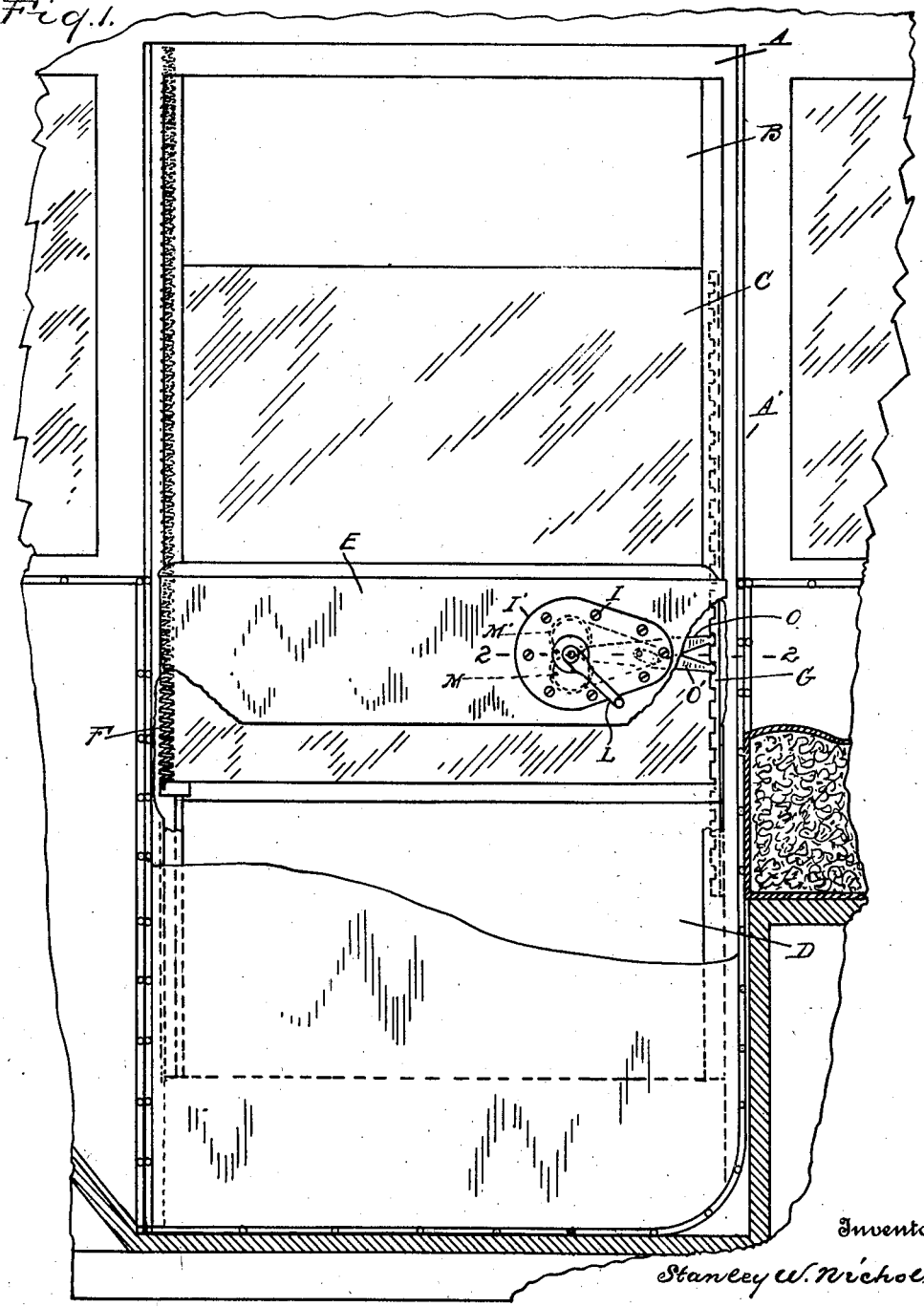
Figure 1 is an interior view of an automobile door equipped with the improved control mechanism.

In these views the reference character A designates an automobile door having in its upper portion the window opening B and provided with a closure for said window having the nature of a sliding glass plate C. Said closure in open position is adapted to enter a chamber D formed, as is common practice, in the lower portion of the door A. E is the usual lock board connecting the uprights A' of the door between the window opening B and chamber D. A coiled counter-balance spring F is attached at its lower end to the closure C at the lower edge thereof and has its upper extremity attached to said door adjacent the upper margin of the opening B. The details of the mounting of this spring need not be described here as they are the subject of a separate invention as shown in my Patent Number 1,538,444. The spring F, as is evident from Figure 1, is extended within one of the uprights A' of the door and adjacent the other upright A' there extends a rack-bar G which is rigidly attached to the adjacent edge of the plate C, extending downwardly from the top of said plate and projecting a short distance below the same. Said bar G is channeled, as indicated at G', to embrace the glass, and some suitable adhesive G² may be employed in the channel G' to rigidly secure the bar to the glass. It is preferred, as shown in Figure 3, to form the rack teeth of the bar G adjacent the channel G' and in proximity to the interior face of the glass C. H designates a slideway, formed of felt or similar yieldable material, engaged by the bar G. To the inner face of the lock board E there is secured by screws I' a plate I providing a mounting for mechanism for vertically actuating the closure C and for latching the same. Thus J is a bearing member mounted in said plate and projecting through the lock board E. K is a shaft journaled in said bearing and carrying an actuating handle adjacent the inner face of the lock board. Adjacent the outer face of said board, there is mounted fast upon the shaft K a pair of oppositely projecting eccentrics M, respectively engaging in slots N formed in corresponding extremities of a pair of adjacent control arms O and O', said eccentrics being formed with flanges M' embracing said arms marginally of the slots N and thus maintaining the arms in operative engagement with the eccentrics. Said arms extend parallel to the plate C from the eccentrics M toward the rack-bar G and are gradually tapered from their eccentric-engaging ends to their opposite extremities, the latter being proportioned to engage in the notches formed between the teeth of the rack-bar. The end faces of said arms which engage the rack are preferably slightly curved, as is best seen in Figure 3, and adjacent said faces the arms are formed with a slightly reduced neck portion O², the purpose of which will presently appear. The arms O and O' are fulcrumed intermediately upon a pin P secured to the plate I and projecting outwardly therefrom, passing through the lock board. Said arms are similarly slotted to engage said pin, as indicated at Q, said slots extending lengthwise of the arms and being proportioned in length to permit such endwise shifting of the arms as the eccentrics M are adapted to effect. Each slot Q has a reduced extension toward the rack-engaging end of the arm, as indicated at R, and within said extension there is mounted a coiled spring S held in place by a tongue T projecting toward the pin P from the end of said extension remote from said pin, the spring being compressed between said end and said pin. Thus the two arms are independently urged by the spring S in a direction tending to maintain their engagement with the rack G.

In the operation of the described construction, a clockwise actuation of the handle L, as indicated by the arrows in Figure 3, effects raising of the glass C, and lowering thereof results from counter-clockwise turning of said handle. When the handle is released, the arms O and O', owing to the effort of the springs S, tend to assume the divergent relation shown in Figure 1, the eccentrics M then occupying a vertically opposed relation, and the plate C being locked against movement either up or down. The locking of said plate under the described conditions follows from the fact that the two eccentrics when vertically opposed form a brace between the larger ends of the arms, preventing the swinging thereof that must accompany any movement of the glass. Assuming the initial position of the control arms to be that shown in Figure 4, upon a clockwise turning of the handle, the two arms are rocked oppositely, the arm O being retracted, before it can exercise a down pressure upon the rack and the arm O' maintaining engagement with the rack during a half turn and consequently raising the rack plate C. When a half turn is completed, the two arms will have reversed their positions. During the next half turn, completing a revolution, the arm O will exercise the lifting effect and the arm O' will be retracted. Thus the two arms will alternate in exercising a lifting effect upon the rack, this effect occurring while the corresponding eccentrics are swinging downwardly. When the eccentrics are undergoing the upward portion of their travel the arms will be retracted. Upon counter clockwise actuation of the handle, the arms will act during upward travel of the eccentrics to lower the rack and will be retracted as the eccentrics undergo the downward portion of their movement.

Thus it is seen that locking of the sliding plate in any desired position of adjustment is effected by simply releasing the handle, eliminating necessity for any locking device auxiliary to the mechanism which actuates travel of the glass.

What I claim as my invention is:—

1. In a window control mechanism, a sliding window member, a rack bar carried thereby and extending in the direction of travel thereof, a pair of co-pivotal control arms having corresponding ends engaging said rack and adapted for a limited bodily movement to or from the rack, means yieldably urging said arms bodily toward the rack, a common means for rocking said arms and for alternately withdrawing the same bodily from the rack.

2. In a window control mechanism, the combination with a sliding window member, of a rack carried thereby and extending in the direction of travel thereof, a stationary fulcrum member, a pair of control arms terminally engaging said rack and longitudinally slotted to engage said fulcrum member, said arms being also longitudinally slotted at their ends remote from the rack, an actuating shaft for said arms, oppositely disposed eccentrics upon said shaft and engaging respectively in the end slots of said arms, and means yieldably urging said arms toward the rack.

3. In a window control mechanism, a sliding window member, a stationary fulcrum member, a pair of actuating arms for the sliding member mounted upon said fulcrum element and slotted longitudinally to provide for a sliding of said arms into or out of engagement with the closure, guiding means for said arms engaging in the slots thereof, and springs arranged within the slots of said arms urging the latter into engagement with the window member.

4. In a window control mechanism, the combination with a sliding closure provided with a rack, of a plurality of rotatable eccentrics, arms mounted on said eccentrics, each having but one end engageable with the teeth of said rack, means on said eccentrics for guiding the same and means compelling movement of said arms to bring their ends into engagement with the rack teeth but permitting rotation of said eccentrics after the engagement.

5. In a window control mechanism, the combination with a sliding closure, of a plurality of rotatable eccentrics, a member upon said sliding closure, a cooperating member upon each eccentric, flanges upon each eccentric for guiding the respective cooperating members, one of said members having a series of teeth and the other a single bearing surface engageable with said teeth, and means cooperating with said eccentrics and in engagement at all times with said cooperating members for assisting in supporting the same.

6. In a window control mechanism, the combination with a movable closure, of a plurality of rotatable eccentrics, a member upon said closure, cooperating members having a lost motion connection with said eccentrics, means tending to yieldably force said cooperating members into engagement with said member upon the closure, and means cooperating with said eccentrics and in engagement at all times with said cooperating members for assisting in supporting the same.

In testimony whereof I affix my signature.

STANLEY W. NICHOLSON.